(12) United States Patent
Herr et al.

(10) Patent No.: US 8,230,078 B2
(45) Date of Patent: Jul. 24, 2012

(54) ACCEPT AND RECEIVE ENHANCEMENTS

(75) Inventors: David A. Herr, Apex, NC (US);
Constantinos Kassimis, Cary, NC (US);
Jean K. Hawrysz, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 12/542,870

(22) Filed: Aug. 18, 2009

(65) Prior Publication Data

US 2011/0047276 A1 Feb. 24, 2011

(51) Int. Cl.
*G06F 15/16* (2006.01)
(52) U.S. Cl. .......................... 709/227; 718/102; 718/104
(58) Field of Classification Search .......... 709/204–207, 709/217–219, 223–237, 248–250, 200; 370/236–236.2, 252, 395.2–395.4, 395.52–395.53, 370/412–416, 496; 714/15, 21, 39, 48–51, 714/55, 704–707, 746–749, 798–799, 811, 714/815; 719/314, 318, 328, 310
See application file for complete search history.

(56) References Cited

U.S. PATENT DOCUMENTS

| | | | | |
|---|---|---|---|---|
| 5,617,570 A * | 4/1997 | Russell et al. | | 719/312 |
| 6,427,161 B1 * | 7/2002 | LiVecchi | | 718/102 |
| 6,651,111 B2 * | 11/2003 | Sherman et al. | | 710/14 |
| 6,816,910 B1 * | 11/2004 | Ricciulli | | 709/237 |
| 6,823,515 B2 * | 11/2004 | LiVecchi | | 718/105 |
| 7,069,313 B2 * | 6/2006 | Alam et al. | | 709/223 |
| 7,174,393 B2 * | 2/2007 | Boucher et al. | | 709/250 |
| 7,284,070 B2 * | 10/2007 | Boucher et al. | | 709/250 |
| 7,376,741 B1 * | 5/2008 | Carter et al. | | 709/228 |
| 7,424,710 B1 * | 9/2008 | Nelson et al. | | 718/1 |
| 7,571,247 B2 * | 8/2009 | Banerjee et al. | | 709/232 |
| 7,613,813 B2 * | 11/2009 | Hussain et al. | | 709/227 |
| 7,865,954 B1 * | 1/2011 | Phoha et al. | | 726/23 |
| 7,911,994 B2 * | 3/2011 | Clarke et al. | | 370/328 |
| 7,930,349 B2 * | 4/2011 | Hussain et al. | | 709/205 |
| 2002/0112061 A1 * | 8/2002 | Shih et al. | | 709/229 |
| 2004/0237082 A1 * | 11/2004 | Alcazar et al. | | 717/174 |
| 2005/0027872 A1 * | 2/2005 | Srinivas | | 709/227 |
| 2006/0282508 A1 * | 12/2006 | Venkatsubra et al. | | 709/217 |
| 2006/0282537 A1 * | 12/2006 | Venkatsubra et al. | | 709/228 |
| 2009/0248878 A1 * | 10/2009 | Tran et al. | | 709/227 |
| 2010/0268798 A1 * | 10/2010 | Kourkouzelis et al. | | 709/220 |

* cited by examiner

*Primary Examiner* — Greg C Bengzon
(74) *Attorney, Agent, or Firm* — Law Office of Jim Boice

(57) ABSTRACT

A server issues an enhanced accept and receive call to a client computer. The enhanced accept and receive call requires the server to subsequently receive a block of data from the client computer in order to establish a session connection between the client computer and a server resource. In response to the block of data from the client computer failing to be received by the server, the server prevents the session connection from being pushed onto an accept queue on the server until the server executes a corrective process.

11 Claims, 5 Drawing Sheets

ACCEPT AND RECEIVE ENHANCEMENTS

BACKGROUND

The present disclosure relates to the field of computers, and specifically to networked computers. Still more particularly, the present disclosure relates to establishing communication sessions between computers.

BRIEF SUMMARY

A server issues an enhanced accept and receive call to a client computer. The enhanced accept and receive call requires the server to subsequently receive a block of data from the client computer in order to establish a session connection between the client computer and a server resource. In response to the block of data from the client computer failing to be received by the server, the server prevents the session connection from being pushed onto an accept queue on the server until the server executes a corrective process.

DETAILED DESCRIPTION

Figure 1:
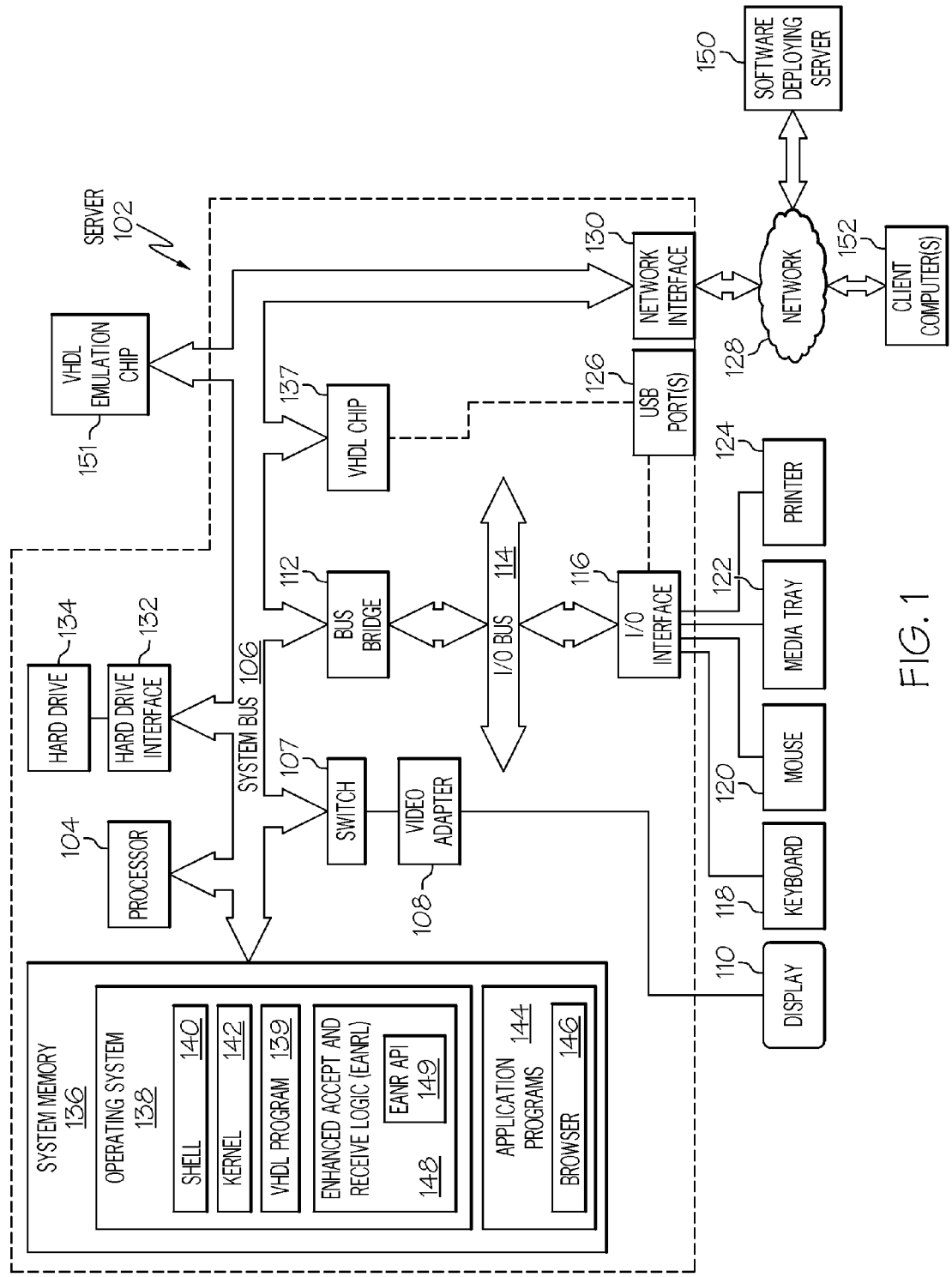
FIG. 1 depicts an exemplary hardware device in which the present invention may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer readable medium(s) may be utilized. The computer-readable medium may be, for example but not limited to, an electronic, magnetic, optical, electromagnetic, infrared, or semiconductor system, apparatus or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-readable medium may be any medium that can store the program for use by or in connection with the instruction execution system, apparatus, or device.

Computer program code for carrying out operations of the present invention may be written in any combination of one or more programming languages, including an object oriented programming language such as Java (JAVA is a registered trademark of Sun Microsystems, Inc. in the United States and other countries), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary server 102, which depicts one example of an appropriately configured hardware device that may be utilized by the present invention. Note that some or all of the exemplary architecture, including both depicted hardware and software, shown for and within server 102 may be utilized by software deploying server 150 and/or client computer(s) 152.

Server 102 includes a processor unit 104 that is coupled to a system bus 106. Processor unit 104 may utilize one or more processors, each of which has one or more processor cores. A video adapter 108 drives/supports a display 110, which is an output display that is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., enhanced accept and receive logic—EANRL 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below) external USB port(s) 126. While the format of the ports connected to I/O interface 116 may be any known to those skilled in the art of computer architecture, in a preferred embodiment some or all of these ports are universal serial bus (USB) ports.

As depicted, server 102 is able to communicate with a software deploying server 150 and/or client computer(s) 152 via network 128 using a network interface 130. Network 128 may be an external network, wired or wireless, such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in server 102. This volatile memory includes additional higher levels of volatile memory (not shown), including, but not limited to, cache memory, registers and buffers. Data that populates system memory 136 includes server 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., server 102) to send and receive network messages to the Internet using hypertext transfer protocol (HTTP) messaging, thus enabling communication with software deploying server 150 and other described computer systems.

The operating system 138 in server 102's system memory also includes an enhanced accept and receive logic (EANRL) 148. EANRL 148 comprises an enhanced accept and receive application program interface (EANR API) 149, which provides an API for implementing the processes described below, including those described in FIGS. 2-5. In one embodiment, server 102 is able to download EANRL 148 from software deploying server 150, including in an on-demand basis. Note further that, in one embodiment of the present invention, software deploying server 150 performs all of the functions associated with the present invention (including execution of EANRL 148), thus freeing server 102 from having to use its own internal computing resources to execute EANRL 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from EANRL 148 causes VHDL program 139 to configure VHDL chip 137, which may be an FPGA, ASIC, etc.

In another embodiment of the present invention, execution of instructions from EANRL 148 results in a utilization of VHDL program 139 to program a VHDL emulation chip 151. VHDL emulation chip 151 may incorporate a similar architecture as described above for VHDL chip 137. Once EANRL 148 and VHDL program 139 program VHDL emulation chip 151, VHDL emulation chip 151 performs, as hardware, some or all functions described by one or more executions of some or all of the instructions found in EANRL 148. That is, the VHDL emulation chip 151 is a hardware emulation of some or all of the software instructions found in EANRL 148. In one embodiment, VHDL emulation chip 151 is a programmable read only memory (PROM) that, once burned in accordance with instructions from EANRL 148 and VHDL program 139, is permanently transformed into a new circuitry that performs the functions needed to perform the process described below in FIGS. 2-5.

The hardware elements depicted in server 102 are not intended to be exhaustive, but rather are representative to highlight essential components required by the present invention. For instance, server 102 may include alternate memory storage devices such as magnetic cassettes, digital versatile disks (DVDs), Bernoulli cartridges, and the like. These and other variations are intended to be within the spirit and scope of the present invention.

Figure 2:
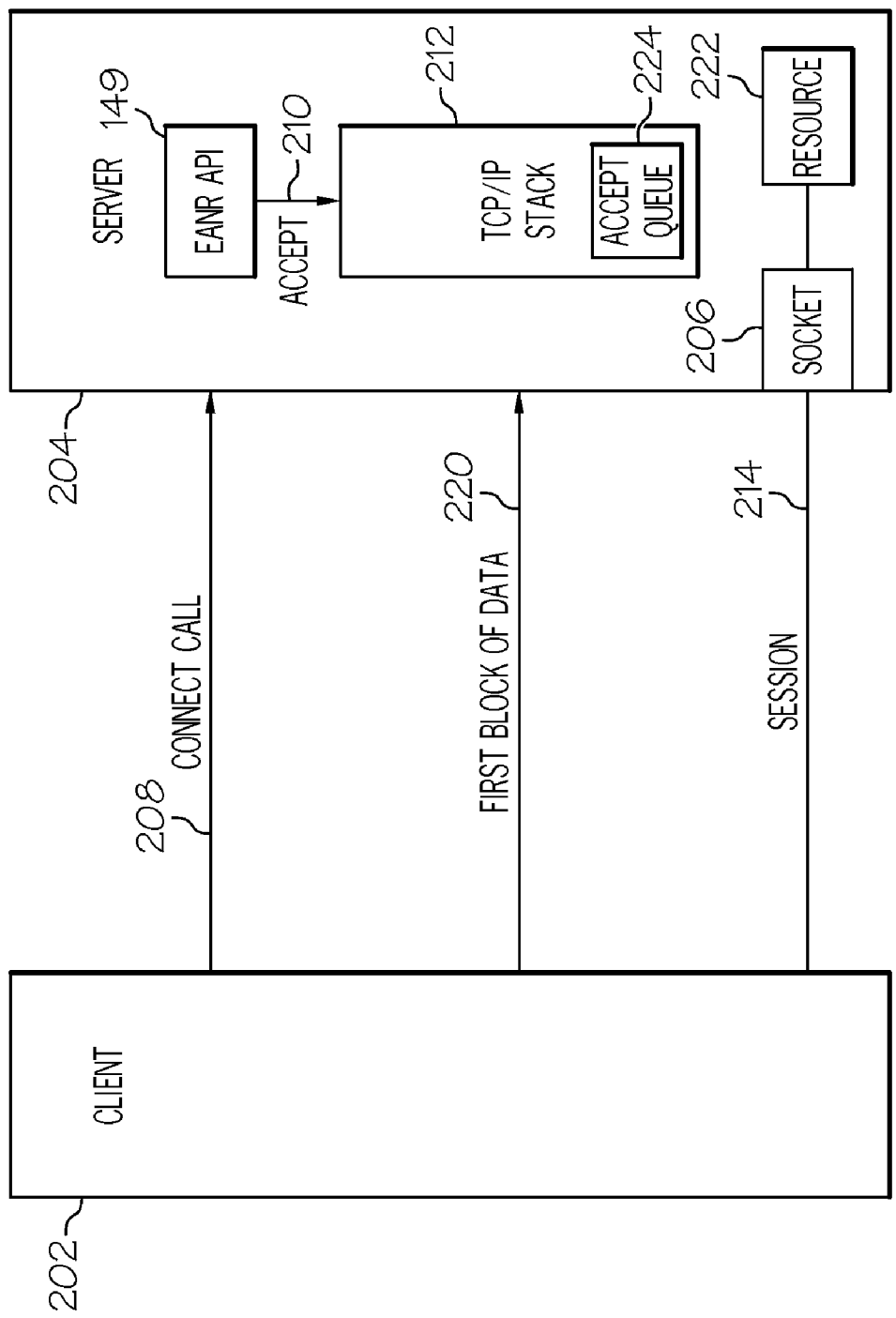
FIG. 2 is a mixed flow chart of exemplary steps taken during an enhanced accept and receive (EANR) call in accordance with one embodiment of the present invention.

Referring now to FIG. 2, an exemplary overview of an environment in which EANRL 148 is utilized in one embodiment of the present invention is presented. Assume that a client 202 (e.g., one of the client computer(s) 152 shown in FIG. 1) wants to initiate, via a socket 206, a session 214 for a resource 222 from a server 204 (e.g., server 102 shown in FIG. 1). Resource 222 may be a software application, a link to a website, a hardware resource (e.g., storage memory, a printer, a network, etc.), or any other resource or service provided by the server 204. In order to establish session 214 with socket 206, the client 202 issues a connect call 208 to the server 204. The server 204, meanwhile, issues an enhanced accept and receive (EANR) call by invoking EANR API 149. If this were an ordinary ANR call instead of an EANR call, the connect would result in the accept message 210 being pushed onto an accept queue 224 on a transfer control protocol/internet protocol (TCP/IP) stack 212 before the first block of data has been received by the server.

However, if first block of data 220 should fail to be received by TCP/IP stack 212, due to a malicious client 202, a break in the connection between client 202 and server 204, faulty bandwidth, software errors, etc., a normal ANR call would cause accept queue 224 and TCP/IP stack 212 to lock up while accept queue 224 waits on first block of data 220 to arrive (which may never happen). To avoid this, EANR API 149 prevents the accept message 210 from being pushed onto the TCP/IP stack 212 until the first block of data 220 actually arrives, or until some other corrective process (described below) is executed.

Figure 3:
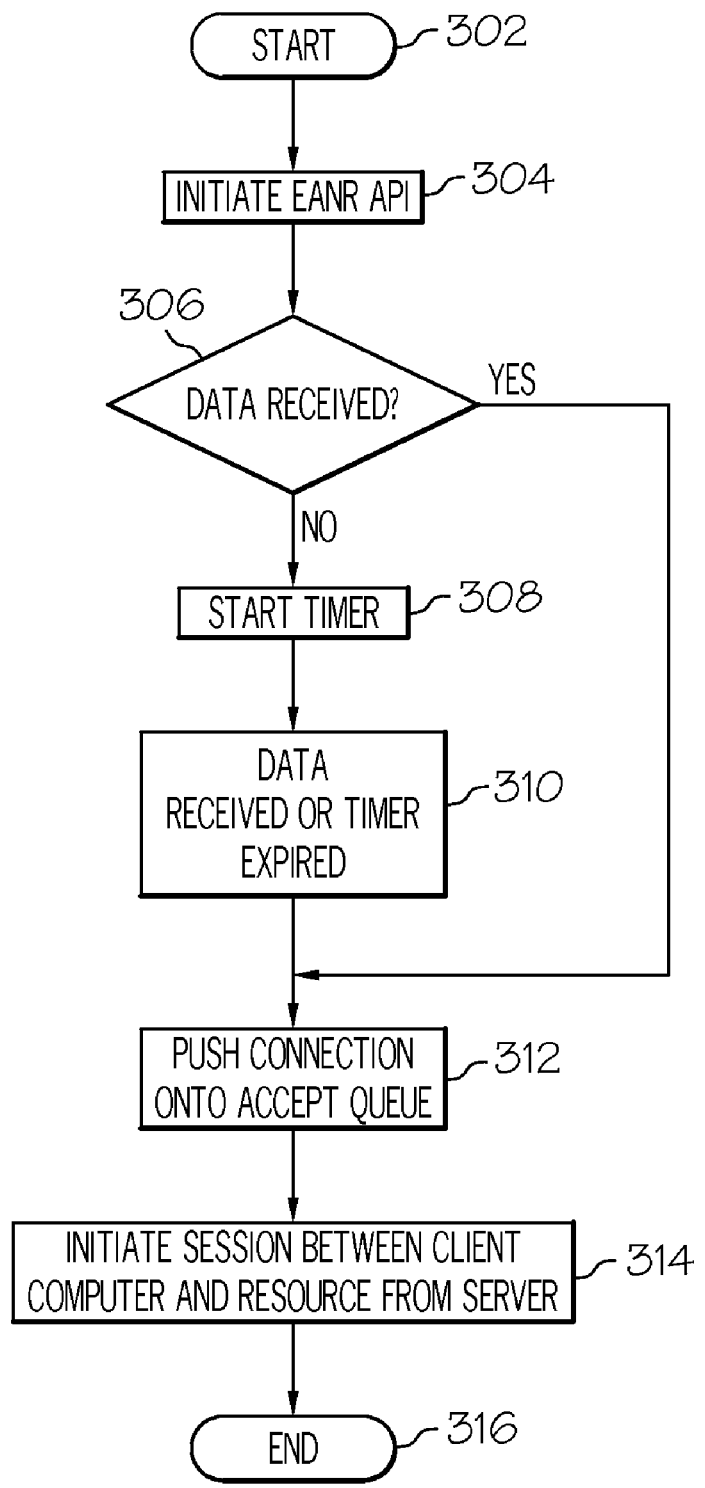
FIG. 3 is a high-level flow chart of an exemplary embodiment of EANR using a timer.

With reference now to FIG. 3, a high-level flow chart of an exemplary embodiment of the use of a novel enhanced accept and receive (EANR) application programming interface (API) call is presented. After initiator block 302, which may be prompted by a client computer connecting to a server, the EANR API is initiated (block 304). If data from the client computer is promptly received by the server (query block 306), then the connection is pushed onto the accept queue of the TCP/IP stack of the server (block 312). This permits the conclusion of a normal ANR call, resulting in the client computer being connected to the desired resource from the server (block 314), and ending the process (terminator block 316). However, if data is not promptly received from the client computer (query block 306), then a corrective process in the form of a timer is started (block 308). As soon as the data is received from the client computer or the timer expires (query block 310), the connection is pushed onto the accept queue (block 312). Thus, the accept queue is not touched until the EANR determines that the session is actually ready, either by a traditional receipt of data from the client computer, or by a timer expiring, thus overriding the ANR requirement that data be received from the client computer in order to complete the ANR call.

Figure 4:
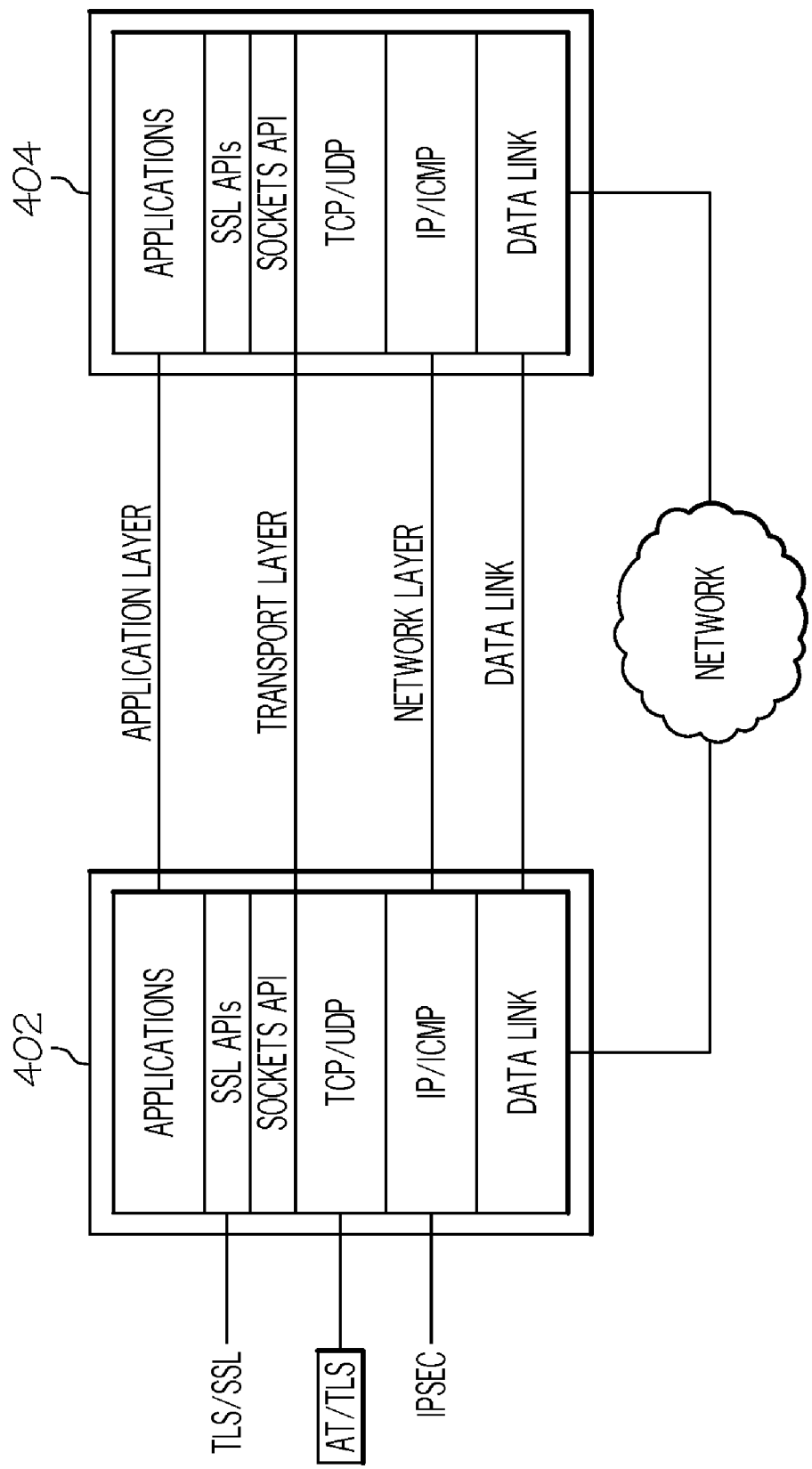
FIG. 4 depicts an overview of application transparent—transport layer security (AT-TLS) as used with the EANR in one embodiment of the present invention.

In one embodiment of the present invention, a security session and/or an asynchronous session may be part of an ANR call. For example, assume that the cryptographic protocol application transparent transport layer security (AT-TLS) is used to provide security for communications between a client computer 402 and a server 404, as shown in FIG. 4. As depicted, AT-TLS is a unique usage of TLS on the operating system (OS) end of the session. Instead of having the application itself be TLS-capable and TLS-aware, the establishment of the TLS connection is pushed down the stack into the TCP layer. This permits applications on operating systems such as z/OS to run without ever being aware that the connection is using TLS. Remote clients cannot distinguish between "normal" TLS (where the application is doing the socket calls necessary for TLS) and AT-TLS (where the TCP layer handles the connection). As depicted in FIG. 4, the AT-TLS layer is implemented at a lower layer than the standard TLS. Because TCP/IP is a layered protocol, the changes done at the TCP layer are hidden from the application layer. This allows AT-TLS to appear identical to normal TLS to any application connecting to the z/OS host.

Figure 5:
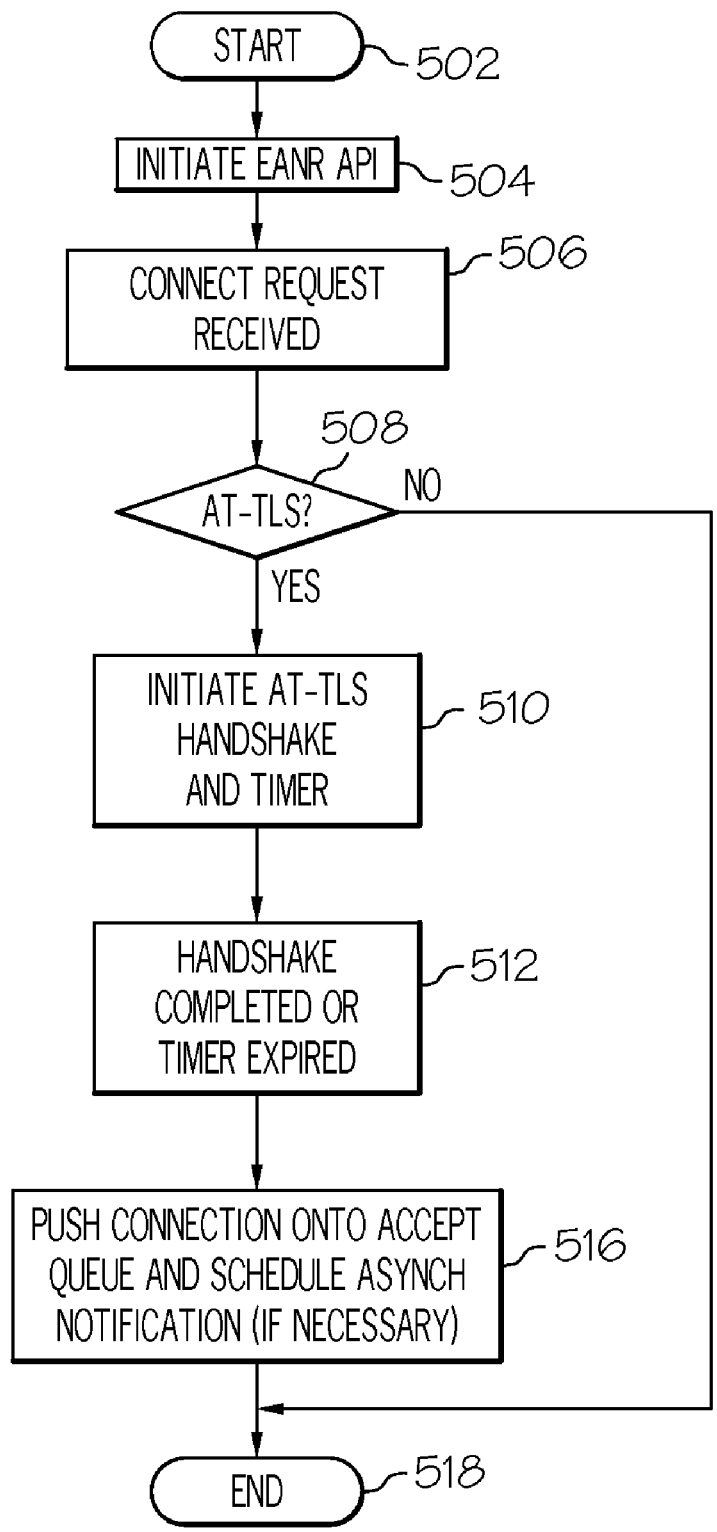
FIG. 5 is a high-level flow chart of an exemplary use of the EANR with AT-TLS and asynchronous client/server sessions.

A concern associated with the use of AT-TLS is that AT-TLS can have a long handshake period before data is received by the server that, without the presently described enhancement to ANR API's, presents another roadblock to the server accepting the connection. That is, a traditional ANR will wait until AT-TLS completes handshaking between the client computer and the server, thus causing a stall in the TCP/IP and accept queue of the server. In order to address this issue, the presently presented EANR requires the AT-TLS handshake to be completed and data to have arrived before the connection is placed on the accept queue in the TCP/IP stack. A high-level flow-chart depicted in FIG. 5 presents a novel computer-implemented method for addressing this issue with the use of an EANR.

After initiator block 502, the EANR API is initiated (block 504). After a connect request for a session is received from the client computer (block 506), a query is made (query block 508) as to whether the session will include the use of AT-TLS security protocol. If not, then the connection is pushed onto the accept queue (block 516) in a manner described in FIG. 3.

If AT-TLS security protocol is used, then AT-TLS security handshaking is initiated (block 510). A timer is set at this point, in order to avoid the AT-TLS handshake from hanging up, thus resulting in a stall. As depicted in block 512, as soon as the handshaking is completed and client data has arrived (or the timer expires), then the connection is completed (block 516), and the process ends (terminator block 518). As described and depicted, the EANR session is not held up by the AT-TLS process, since the AT-TLS process is completed before the EANR session connectors are pushed onto the accept queue in the TCP/IP stack on the server.

Thus, as described herein, in one embodiment of the present disclosure the server may issue an asynchronous version of the EANR API call. In this scenario, the flows depicted in FIG. 3 (non-AT-TLS) or FIG. 5 (AT-TLS) would occur before the TCP stack would signal the server that the asynchronous processing can be completed.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of processing an accept and receive call, the computer implemented method comprising:
    a server issuing an accept and receive call, wherein the accept and receive call requires the server to subsequently receive a block of data from a client computer in order to accept a connection between the client computer and a server resource that is provided by the server, wherein the server resource is external to the server, and wherein the block of data is data to be processed by the server resource after a communication session has been established between the client computer and the server, and wherein the accept and receive call is performed by an enhanced accept and receive application program interface (EANR API); and
    in response to the block of data from the client computer failing to be received by the server, preventing the connection from being pushed onto an accept queue on the server until a corrective process is executed on the server, wherein the corrective process is a completion of an application transparent transport layer security (AT-TLS) process for establishing a secure connection between the client computer and the server, and wherein the AT-TLS pushes an establishment of a TLS connection down a stack into a transmission control protocol (TCP) layer.

2. The computer-implemented method of claim 1, wherein the server resource is a hardware resource.

3. The computer-implemented method of claim 1, wherein the accept queue is not touched until the accept and receive call determines that a session between the client computer and the server resource is actually ready.

4. The computer-implemented method of claim 1, wherein the corrective process is a timer expiration process.

5. The computer-implemented method of claim 1, wherein the server resource is a link to a website.

6. A computer program product for processing an accept and receive call, said computer program product comprising:
    a computer readable storage media;
    first program instructions for a server to issue an accept and receive call, wherein the accept and receive call requires the server to subsequently receive a block of data from a client computer in order to accept a connection between the client computer and a server resource that is provided by the server, wherein the block of data is data that arrives at the server after a communication session has been established between the client computer and the server, and wherein the accept and receive call is performed by an enhanced accept and receive application program interface (EANR API); and
    second program instructions for, in response to the block of data from the client computer failing to be received by the server, preventing the connection from being pushed onto an accept queue on the server until a corrective process is executed on the server, wherein the corrective process is a completion of an application transparent transport layer security (AT-TLS) process for establishing a secure connection between the client computer and the server, and wherein the AT-TLS pushes an establishment of a TLS connection down a stack into a transmission control protocol (TCP) layer, and wherein
    said first and second program instructions are stored on said computer readable storage media.

7. The computer program product of claim 6, wherein the server resource is a software service that is managed by the server.

8. The computer program product of claim 6, wherein the first and second program instructions are downloaded to the server from a software deploying server in an on-demand basis.

9. A computer system comprising:
    a central processing unit (CPU), a computer readable memory, and a computer readable storage media;
    first program instructions for a server to issue an accept and receive call, wherein the accept and receive call requires the server to subsequently receive a block of data from a client computer in order to accept a connection between the client computer and a server resource that is provided by the server, wherein the block of data is data that arrives at the server after a communication session has been established between the client computer and the server, and wherein the accept and receive call is performed by an enhanced accept and receive application program interface (EANR API); and
    second program instructions for, in response to the block of data from the client computer failing to be received by the server, preventing the connection from being pushed onto an accept queue on the server until a corrective process is executed on the server, wherein the corrective process is a completion of an application transparent transport layer security (AT-TLS) process for establishing a secure connection between the client computer and the server, and wherein the AT-TLS pushes an establishment of a TLS connection down a stack into a transmission control protocol (TCP) layer, wherein
    said first and second program instructions are stored on said computer readable storage media for execution by said CPU via said computer readable memory.

10. The computer system of claim 9, wherein the corrective process is a timer expiration process.

11. The computer system of claim 9, wherein the server resource is a software service that is managed by the server.

* * * * *